Figure 2:
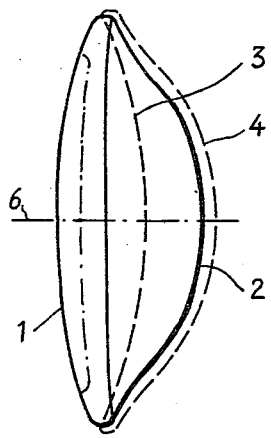

Nov. 19, 1963 — L. PÉRAS — 3,111,345
UPHOLSTERY OF SEATS AND SEAT-BACKS, IN PARTICULAR FOR
THE SEATS OF AUTOMOBILE VEHICLES
Filed May 25, 1961 — 4 Sheets-Sheet 1

Inventor
Lucien Péras
By Stevens Davis Miller & Mosher
Attorneys

Nov. 19, 1963          L. PÉRAS          3,111,345
UPHOLSTERY OF SEATS AND SEAT-BACKS, IN PARTICULAR FOR
THE SEATS OF AUTOMOBILE VEHICLES
Filed May 25, 1961          4 Sheets-Sheet 3
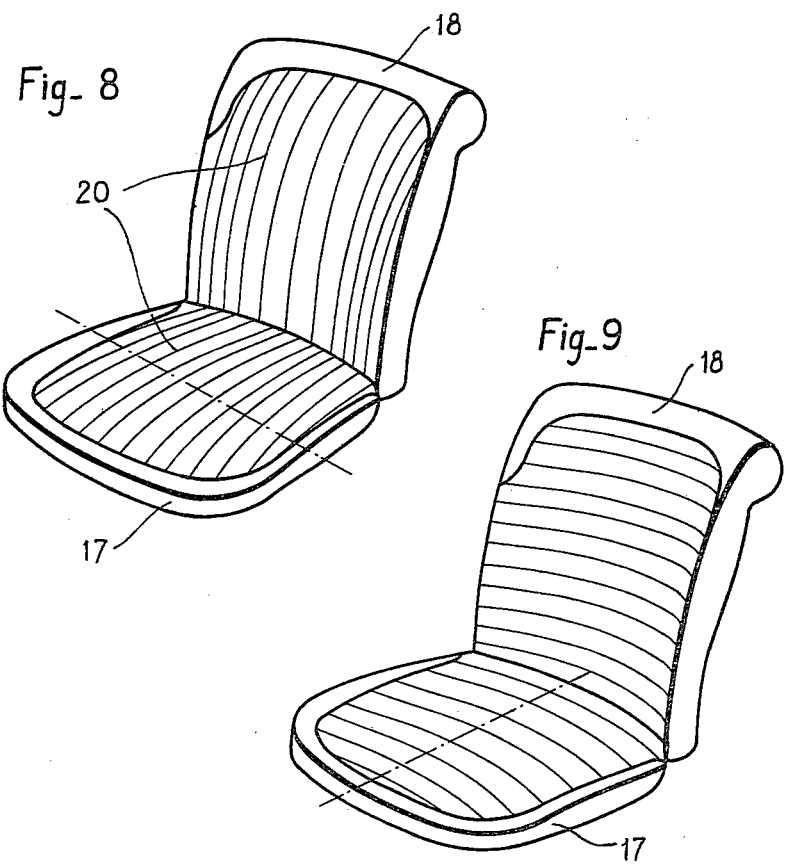
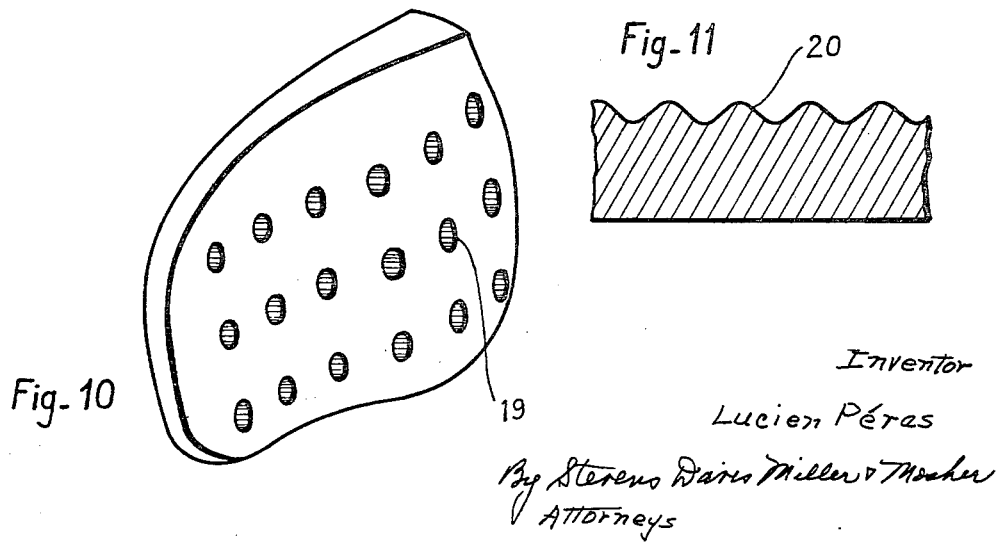
Inventor
Lucien Péras
By Stevens Davis Miller & Mosher
Attorneys

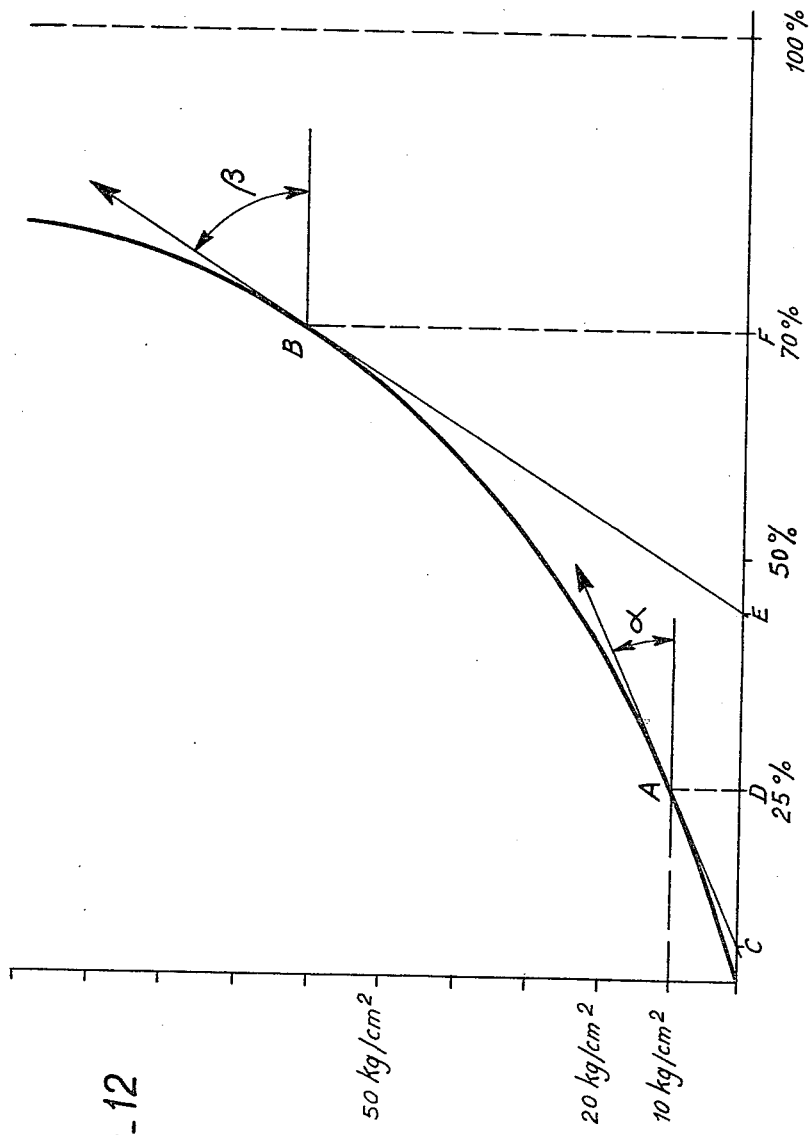

United States Patent Office 3,111,345
Patented Nov. 19, 1963

3,111,345
UPHOLSTERY OF SEATS AND SEAT-BACKS, IN PARTICULAR FOR THE SEATS OF AUTOMOBILE VEHICLES
Lucien Péras, Billancourt, France, assignor to Regie Nationale des Usines Renault, Billancourt, France
Filed May 25, 1961, Ser. No. 112,614
Claims priority, application France June 24, 1960
3 Claims. (Cl. 297—455)

The invention is concerned with the upholstery of seats and seat-backs, especially for seats intended for automobile vehicles, this upholstery being constituted by a moulded unit of special shape made of elastic sponge material.

There exist already a large number of forms of seat upholstery of sponge material, both moulded and not moulded, and having particular shapes directed to obtaining certain advantages. In accordance with the invention, the shape given to the moulded cushion is determined, in view of the elastic properties of the material, in such manner that a passenger seated on the upholstery, the latter being placed on a supporting frame, elastic or otherwise, is supported by the reactions of the upholstery which are distributed according to the laws of unit pressures which have been recognized as the best as a result of physiological studies.

For example, it is known that the seat of a person can withstand a high pressure while the thighs should be subjected only to a low pressure, the optimum values of these pressures being known with a certain degree of accuracy.

This condition being observed, the shape of the upholstery is also determined in such manner that the flexibility under load of the upholstery may be substantially constant at all points.

In view of the highly concave shape of the curves of flexibility of these materials, the above condition leads to the utilization of shapes, the thickness of which varies very considerably over different zones.

In practice, in the zones in which the unit pressure is the highest, the maximum thickness should be used, while in the zones in which the unit pressure has its least value, the thickness must be a minimum.

In addition to these two characteristics, the invention relates to an upholstery in which there is incorporated during the moulding operation a more rigid periphery which gives a good support for the covering material in the case where the covering is placed in position subsequently, or a covering material comprising a more rigid periphery in the case where the seating is obtained by moulding inside the lining material which has previously been disposed in the mould.

It is also provided that the cushions may comprise a certain number of cells with the object of modifying the weight, the flexibility and the damping effect of the material, and it may comprise on its surface in contact with the passenger patterns in the form of grooves intended to facilitate the surface ventilation of the upholstery.

These various characteristics enable an upholstery to be obtained having the following qualities:

Easy manufacture by molding a spongy product;
Good characteristics of exact adaptation of the upholstery to physiological necessities;
Economies, resulting on the one hand from the ease of manufacture, and on the other hand from the minimum weight of product to be employed by reason of the variable thicknesses of the upholstery;
Ease of application and satisfactory behaviour of the covering material permitted by the more rigid periphery incorporated in the mould;
Aeration of the contact surface by the system of grooves produced by moulding on that surface.

In the accompanying drawings, there have been shown by way of example, forms of embodiment of the cushion and of the seat back in accordance with the invention.

Figure 1:
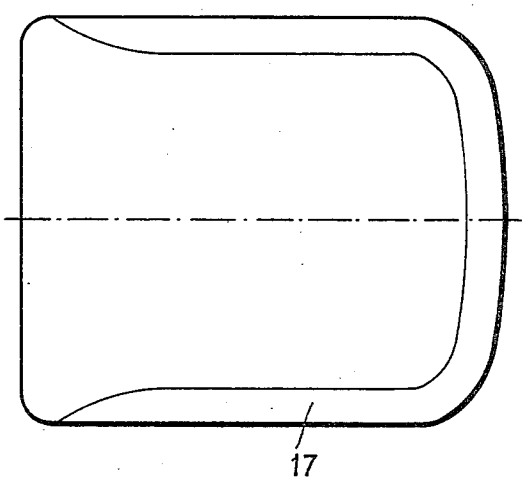
Figure 4:
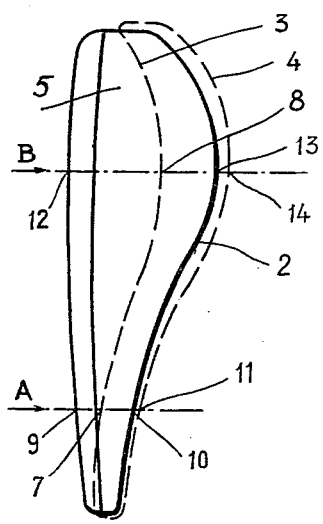
Figure 3:
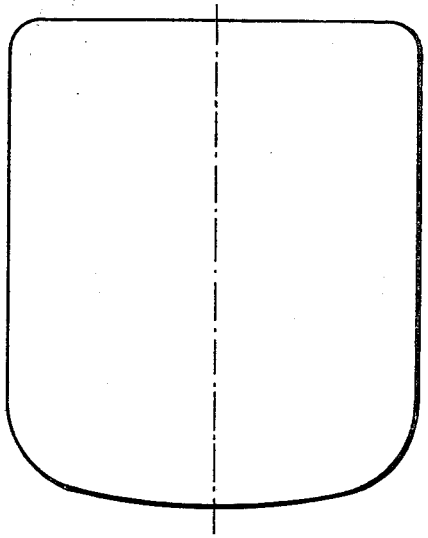
Figure 5:
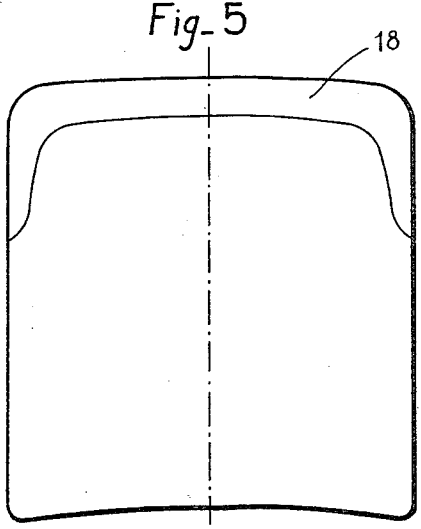
Figure 6:
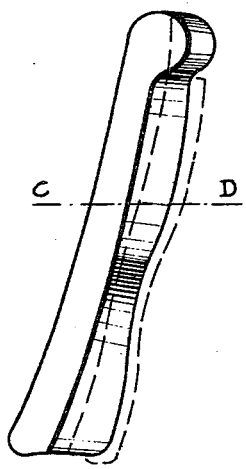
Figure 7:
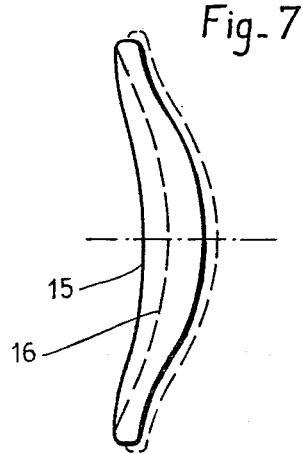

FIG. 1 shows a plan view of one form of cushion.
FIG. 2 is a transverse section of this cushion.
FIG. 3 shows the cushion in plan view and orientated in a different manner, and FIG. 4 a longitudinal cross-section of the cushion.
FIG. 5 relates to a form of back looking on the front side.
FIG. 6 shows a side view of the seat-back.
FIG. 7 is a cross-section taken along the line C—D of FIG. 6.
FIGS. 8, 9, 10 and 11 are concerned with the cellular structure and the grooving of the seat and the seat-back.
FIG. 12 shows a curve giving the depression of the material as a function of the load, the depression being shown in abscissae and the load in ordinates.

Reference being made to FIGS. 1, 2, 3 and 4, it can be seen that the apparent contour of the upholstery is shown in the unloaded position by the lines 1 and 2 and by the lines 3 and 4 when loaded. If there are considered two points A and B located in the plane of symmetry of the cushion 5 (see FIG. 4), the first corresponding for example to the portion below the passenger's thighs and the second below the passenger's seat, for which it is known that the optimum values of the unit pressure are in this case 10 grams per sq. cm. at A and 50 grams per sq. cm. at B, and on the other hand the locations of the points 7 and 8 which correspond to the position of the passenger, the shape and the thickness of the cushion will be determined in the following manner:

In respect of the zone A, referring to the curve giving the depression of a material of constant thickness, it is seen that for 10 grams per sq. cm. there is a depression of 25% and therefore the distance 7 to 11 divided by the distance 9 to 10 will be equal to 0.75. For the zone B, the distance 8 to 14 divided by the distance 12 to 13 will be equal to 0.30, and so on for each zone, having regard to the unit pressures desired.

On the other hand, considering the zones A and B, it can be seen that when account is taken of the law of flexibility of the material, the flexibilities at A and at B, represented by the cotangents of the angles $\alpha$ and $\beta$, are very different, there is chosen as a new condition to bring these flexibilities to substantially equal values by reducing the thickness of the less-loaded zones. Thus, if cot $\beta = \frac{1}{2}$ cot $\alpha$, the thickness at A will be made equal to one-half the thickness at B, which amounts to the same thing as dividing the flexibility at this zone by 2.

It is then a simple matter to determine the shape of the upholstery. Given the maximum thickness at B, by means of the curve of FIG. 12, the thickness is determined which should be given in all the zones as a function of the unit pressure, so that the flexibility is the same at all points. When these thicknesses have been determined, and knowing the depression of the material as a function of the unit pressure, the position of the points 11 is fixed, since the distance 7 to 11 is equal to the calculated thickness multiplied by $(1-\theta)$, where $\theta$ is the value of the depression taken from the curve.

As the surface of the seating position of the passenger is known, the surface of the upholstery support is therefore also known.

On the other hand, the location of the points 9 is known. This is substantially the surface area of the upper face of the seat. Starting from a desired shape of this surface and from the calculated thicknesses of the cushion, the position of the points 10 is obtained. Having regard to the fact that this surface must be substantially in the vicinity of the surface of the unladen support, the shape of which is known under load, a satisfactory compromise for this condition is established and for the desired form of the upper part of the upholstery.

Thus, it can be seen that the shape of the cushion is in this way wholly determined from the seating position of the passenger and from the desired shape of the upper part of the seat, account being taken of the desired law of distribution of pressure and of the condition of substantially equal flexibility.

In this cushion it is seen that the maximum thicknesses of the material correspond to the high pressures, which results in an economical construction.

The seat-back shown in FIGS. 5, 6 and 7 is determined in the same manner from the position of the back 16 from the shape desired for the seat-back 15, from the law of distribution of pressure desired, and from the condition of equal flexibilities.

A second characteristic feature of these upholsteries is that they are constructed by moulding at the same time as the outer shapes 17 and 18, which serve to facilitate the fitting of the covering and to give it a good appearance. These forms may be constituted by horse hair or even by sufficiently flexible plastic material (see FIGS. 8 and 9).

A third characteristic of these upholsteries is that advantage may be taken of the possibilities of moulding in order to arrange recesses or cells 19 in the mass (FIG. 10), with the object of varying the flexibility and the damping effect of the material in certain zones, and also to arrange on the surface a complete system of grooves 20 suitably directed and intended to ventilate the contact surface to the maximum extent, which is often necessary with sponge materials (see FIGS. 8, 9, 11).

The condition of equal flexibility may be replaced by others, such for example as a condition of equal periodicity, which comes to the same thing as varying the thicknesses in such manner that the thickness at A, multiplied by the distance CD (FIG. 12) is equal to the thickness at B multiplied by the distance EF.

This condition is however much less economic than that of equal flexibilities, which gives a satisfactory result.

I claim:

1. Seat and back upholstery for an automobile consisting of moulded foam material made from natural or synthetic polymers or foam resins, said seat and back having a continuously progressive variation in thickness throughout its entire surface area contacted by the occupant of the seat and back, said thickness being dimensioned in depth corresponding to the local unit weight of the portion of the body of the occupant to be applied thereagainst, so the flexibility of the seat and back is identical throughout the surface area and provides complete support over the entire body of the person, said under surface of said seat and back being substantially planar and said depth dimension progressively varying adjacent the front sides upon which the body is supported.

2. Improved seat upholstery in accordance with claim 1, in which, in the case of use of a homogeneous sponge material, the law of flexibility of which is a parabolic curve, a shape is adopted such that the greatest thickness of the upholstery is provided at the zones of highest unit pressures.

3. Improved seat upholstery in accordance with claim 1, in which the moulded form comprises a fairly rigid peripheral covering fixation portion.

References Cited in the file of this patent

UNITED STATES PATENTS

| | | |
|---|---|---|
| 2,359,318 | Lay et al. | Oct. 3, 1944 |
| 2,549,902 | Hibbard et al. | Apr. 24, 1951 |
| 2,847,061 | Morton | Aug. 12, 1958 |
| 2,903,044 | Peras | Sept. 8, 1959 |
| 2,976,916 | Schladermundt et al. | Mar. 28, 1961 |
| 3,014,226 | Wilfert | Dec. 26, 1961 |

FOREIGN PATENTS

| | | |
|---|---|---|
| 150,117 | Great Britain | Sept. 2, 1920 |